May 24, 1960  E. W. LEHTONEN  2,938,158
SINGLE-ENDED MAGNETIC AMPLIFIERS
Filed June 9, 1954  3 Sheets-Sheet 1

INVENTOR
EINO W. LEHTONEN
BY
ATTORNEY

May 24, 1960                E. W. LEHTONEN                2,938,158
                    SINGLE-ENDED MAGNETIC AMPLIFIERS
Filed June 9, 1954                                  3 Sheets-Sheet 3

INVENTOR
EINO W. LEHTONEN
BY
R. V. Craddock
ATTORNEY

United States Patent Office 2,938,158
Patented May 24, 1960

2,938,158

SINGLE-ENDED MAGNETIC AMPLIFIERS

Eino W. Lehtonen, Levittown, N.Y., assignor to Sperry Rand Corporation, a corporation of Delaware Filed June 9, 1954, Ser. No. 435,497

12 Claims. (Cl. 323—89)

This invention concerns magnetic amplifiers and more particularly is directed to an improvement in the so-called self-saturating type of magnetic amplifier or reactor.

In respect to the nomenclature employed in this art, attempts have been made to distinguish between the terms "saturable reactor" and "magnetic amplifier" on the basis of construction, function, or circuitry. It may be said that every magnetic amplifier includes as an essential component, a ferromagnetic device having an adjustable inductive value. In that sense a saturable reactor may be considered to be a component of a magnetic amplifier. In using these terms herein, it is not intended that this disclosure nor the practice of the invention be limited to a particular area of the art, but rather the terms are used interchangeably insofar as their common usage has established their broadest meaning in the art.

In one type of self-saturating magnetic amplifier, a unidirectional current device is customarily serially connected in circuit with each load winding of the reactor to effect self-saturation by blocking the flow of demagnetizing current. A control winding is usually wound in magnetic flux relation to each load winding. The control windings are connected together in a series arrangement to accept a control signal and thereby cause the flow of load current in the load windings to respond accordingly. It is evident that a changing magnetic field caused by the flow of currents in the load windings will induce potentials in the control windings magnetically linked thereto. During the flow of load currents through the load windings, saturation has taken place and there is, therefore, little or no change in the magnetic field.

But during the flow of magnetizing current in the load windings, before saturation has been reached, there is a changing magnetic field produced about the load windings with the result that a potential is induced in each control winding wound in magnetic flux relation to a load winding. When a self-saturating magnetic amplifier is controlled through the use of a direct current or other source of fixed-polarity magnetic bias, the control windings are usually interconnected and arranged with respect to the load windings so as to effect mutual cancellation of the potentials induced in the control windings by the flow of magnetizing current through the load windings.

However, when an alternating current control signal is utilized to regulate the flow of load current, the control windings are arranged so that the alternating current control signal will operate alternately upon associated load windings. In order to effect this result, the series connections between control windings in the alternating current controlled magnetic amplifier are reversed as compared with those of the control windings in the direct current controlled magnetic amplifier. Though this arrangement affords the desired mode of control by an alternating current control signal, it also results in an undesirable potential being developed in the control circuit because the potentials induced in the control windings in this latter type of magnetic amplifier during flow of magnetizing currents through the load windings do not cancel each other.

It is the principal object of the present invention to substantially eliminate the undesirable potential induced in the control windings of a self-saturating type of magnetic amplifier which utilizes alternating current control.

The present invention is particularly intended to eliminate undesirable potentials induced in the control windings of single-ended forms of magnetic amplifiers which will be more thoroughly discussed and described hereinafter. This type of amplifier may be designed to supply a load with either direct current or alternating current power. My copending application Serial No. 435,483, filed June 9, 1954, and entitled "Push-Pull Magnetic Amplifier," discloses an invention which has as its object the solution of the analogous problem presented by the undesired potentials induced in the control windings of push-pull, self-saturating, magnetic amplifiers when adapted to alternating current control.

A self-saturating, alternating current controlled, magnetic amplifier constructed to operate in accordance with the teachings of the present invention will virtually obviate any undesired induced potential which might otherwise be present in its control windings. This makes it unnecessary to use a countermeasure such as a large impedance connected in the control circuit as has sometimes been done in alternating current controlled, self-saturating, magnetic amplifiers of the past in order to dissipate and attenuate the undesired potential induced therein.

The resultant advantages of an increased degree of control and efficiency of a magnetic amplifier due to the virtual elimination of unwanted induced potentials in the control circuit when operating in accordance with the concept of the present invention, will appear more fully from the explanation of the operation of the several embodiments disclosed hereinafter in connection with the drawings in which.

Figure 1:
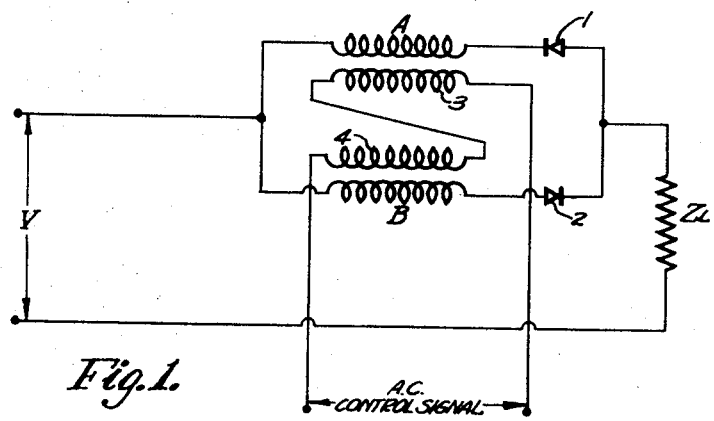
Fig. 1 is a schematic diagram of a single-ended, full-wave, magnetic amplifier arranged and connected for alternating current control.

The magnetic amplifier of Fig. 1 will be used for purposes of illustrating the operation of an alternating current controlled amplifier which supplies alternating current power to a load. In accordance with usual practice, the self-saturating magnetic amplifier may have a unidirectional device connected in series with each load winding so as to block the flow of demagnetizing current therethrough and thereby effect the so-called self-saturation, or it may be arranged in an external feed-back circuit to effect self-saturation in a conventional manner as disclosed in my copending application titled "Improvement in Push-Pull Magnetic Amplifiers." The practice of the present invention is not limited by the manner in which self-saturation is effected.

In the apparatus of Fig. 1, two load current paths are shown, each of which comprises a load winding, such as A and B, and a unidirectional current device connected in series therewith. The unidirectional devices 1 and 2 are connected and arranged with respect to polarity so as to permit half-cycle flow through each unidirectional current device during alternate half cycles of the applied power source, V. The output of the load current paths is connected to a load which in this case is represented as an impedance $Z_L$. The load may be purely resistive but need not necessarily be so.

Each load winding has associated with it a control winding positioned in magnetic flux relation thereto. The control windings 3 and 4 are serially connected together and arranged to accept an alternating current control signal. The alternating current control flux advances or retards the saturation of both load windings A and B in point of time so as to control the amount of current which flows therethrough to the load.

The waveforms employed for illustrative purposes herein are of substantially sinusoidal configuration. In explaining the operation and practice of the present invention sine waves are used in the interest of simplicity and clarity, but the present invention is not limited in its application to magnetic amplifiers operating sinusoidally. The waveforms illustrated herein are of idealized shape and configuration to facilitate understanding the correlation between the operative functions of the magnetic amplifier.

Figure 2:
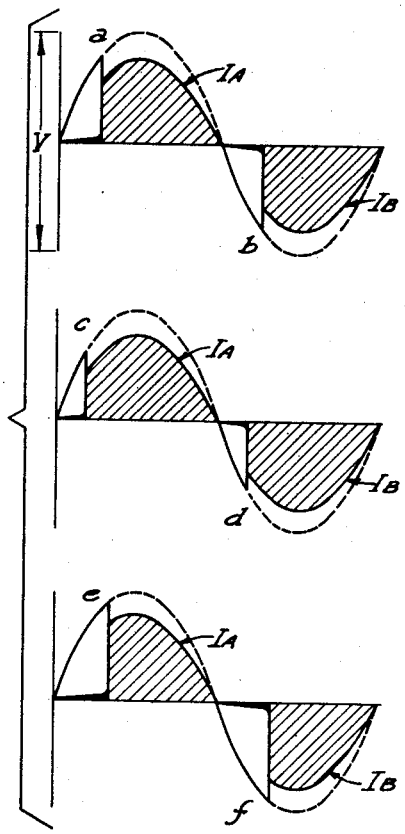
Fig. 2 is a series of waveforms illustrating the relationships of the wave signals applied, developed and realized in operation of the magnetic amplifier of Fig. 1.

Referring now to Fig. 2, the sinusoidal outline of the first waveform represents the alternating current excitation signal which is applied to the magnetic amplifier. Under conditions where no alternating current control signal is applied, during the first portion of the positive half-cycle only a small current will flow through the load windings. This is the magnetizing current represented by the small darkened area adjacent to the abscissa of the diagram.

At a point of time "a" during the positive half-cycle, the reactor becomes saturated and there flows through load winding A and the load $Z_L$ a current having a waveform substantially that indicated by the cross-hatched area identified as $I_A$. The dash line portion of the source potential is effective in causing load current to flow. On the negative portion of the applied excitation voltage, a small negative magnetizing current initially flows in load winding B and upon reaching the point of saturation of the reactor designated as "b," a load current substantially of an amplitude and waveform designated as $I_B$ is caused to flow through load winding B and the load $Z_L$.

Upon the application of an alternating current control signal to the control windings, the firing points of the load windings will either be concurrently advanced or concurrently retarded depending upon the phase relation of the alternating current control signal with respect to the alternating current excitation. The amount of such advance or retardation will depend upon the amplitude of the control signal.

An analysis of the theory of operation and design considerations applicable to alternating current controlled magnetic amplifiers of the self-saturating type may be had from an article written by Sidney B. Cohen which appeared in the Proceedings of the I.R.E., volume 39, No. 9, September 1951.

Assuming for purposes of illustration that an alternating current control signal is applied to the control circuit of the magnetic amplifier of Fig. 1 so as to advance the firing point of the load windings, the second waveform of Fig. 2 illustrates the advanced firing points of the load windings A and B at points "c" and "d" on the positive and negative half-cycles of the excitation potential respectively. Under these conditions it is seen that increased amounts of load current having alternating components $I_A$ and $I_B$ pass through the load windings and through the load $Z_L$.

If, however, the phase of the alternating current control signal is reversed with respect to the alternating current excitation, the firing points of the load windings A and B will be respectively retarded to points "e" and "f" as illustrated on the third waveform of Fig. 2. The result of this retardation is that lesser amounts of current flow on both the positive and negative half-cycles as shown by $I_A$ and $I_B$, respectively in the third waveform of Fig. 2.

During the flow of magnetizing currents to the load windings, there are potentials induced in the control circuit which have substantially the same waveform as the excitation potential applied during those periods. It is this induced potential which is undesirable and unwanted because it detracts from the efficacy of the control signal applied to the control circuit in this type of amplifier. Because of its single-ended operation, no part of the undesired potential which is induced in the control windings of this type of magnetic amplifier is cancelled, but rather the voltage induced in the two control windings add together to produce a potential substantially greater than the potential appearing across either control winding. In a particular design for a magnetic amplifier built in accordance with the teachings of the present invention, this undesired control winding potential was increased by a factor of two.

This is in contrast to the action of a push-pull amplifier wherein the undesired potentials are automatically cancelled in part. My copending application titled "Improvement in Push-Pull Amplifiers" discloses an invention directed to elimination of that portion of the undesired potential induced in the control circuit of a push-pull magnetic amplifier which remains after such partial cancellation.

The present invention affords a method and means of eliminating the undesired induced potential in the control windings in a single-ended, full-wave magnetic amplifier.

Figure 3:
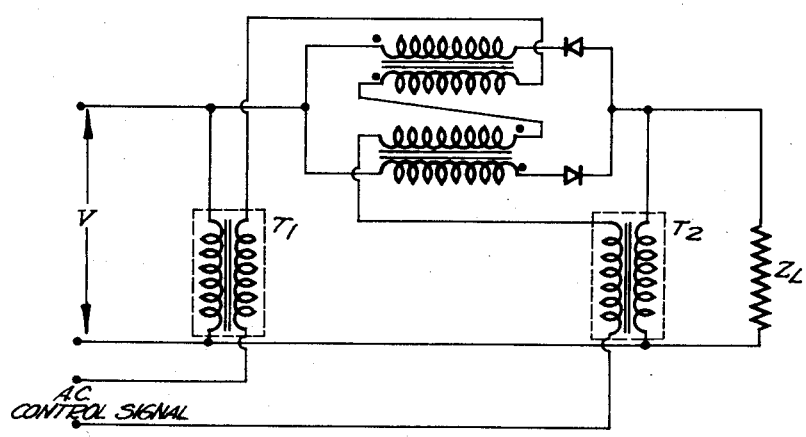
Fig. 3 is a schematic diagram of an embodiment of the present invention.

Referring to Fig. 3, it may be seen that a magnetic amplifier is schematically illustrated as having substantially the same arrangement of load windings and control windings as that of Fig. 1. However, it has added to it means for impressing upon the control circuit additional signals which automatically operate to cancel the undesired potential induced in the control circuit.

By placing a first impedance $T_1$ across the excitation source, a first potential is developed having substantially the waveform of the applied excitation. By placing a second impedance $T_2$ across the load, there is developed thereacross a second potential having substantially the waveform of the load voltage. By impressing both these first and second potentials upon the control circuit in proper polarity and amplitude, cancellation of the unwanted potentials induced therein is achieved.

Figure 4:
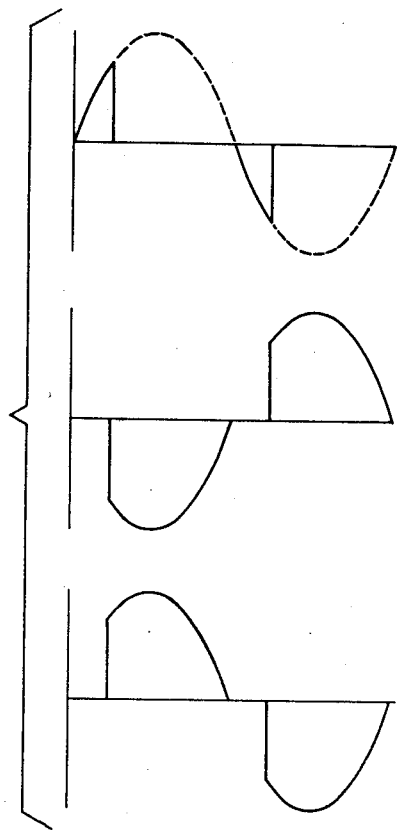
Fig. 4 is a series of waveforms illustrating the relationships of the signals applied and developed in operation of the embodiment of Fig. 3.

Referring to the waveforms of Fig. 4, the operation of the embodiment of Fig. 3 may be better understood. The first waveform of Fig. 4 illustrates by its solid line the waveform of some of the unwanted potentials which are induced in the control windings by the flow of magnetizing current in the load windings. The dash line waveform, which conforms substantially to a part of a sinusoidal wave shape, represents that portion of the applied excitation potential, V, which causes load current to flow. By inserting a first potential of substantially the same waveform as the applied excitation voltage but opposite in phase thereto, the unwanted induced potentials in the control windings are effectively subtracted from the sinusoidal waveform impressed upon the control circuit. The resultant remaining potential across the control windings and impedance T, in series has the waveform shown in the second part of Fig. 4.

If a potential is developed from the load currents having substantially the waveform of the load potentials, it will have a configuration and time relationship essentially that illustrated by the third waveform of Fig. 4. When the latter two waveforms of Fig. 4 are added together in the control circuit of the magnetic amplifier by applying the third waveform thereto in appropriate polarity relationship, it may be readily seen that there is mutual cancellation of the two. This results in final and total concellation of the unwanted induced potentials in the control winding and makes possible an improved and enhanced operation of the magnetic amplifier in that it is more completely responsive to the applied control signal, since the control signal now works into an apparently passive network. The impedances which develop the concellation potentials employed in the magnetic amplifier of Fig. 3 are illustrated as being transformers $T_1$ and $T_2$ appropriately placed in the circuit so as to couple cancellation signals of proper amplitude and phase into the control circuit. It will be evident that to achieve cancellation, the amplitudes of the first and second potentials inserted in the control circuit must be equal and related to the amplitude of the line voltage by the factor $$\frac{2V}{N}$$

where N is the ratio of turns in the signal winding to turns in the control winding of the reactors. The 2 factor accounts for the doubling of amplitude due to the sum of the unwanted potentials induced in the respective control windings. Accordingly, the transformers $T_1$ and $T_2$ should be provided with a 2:1 turns ratio to double the amplitude of the inserted voltages where a 1:1 ratio in the reactors is employed.

Figure 5:
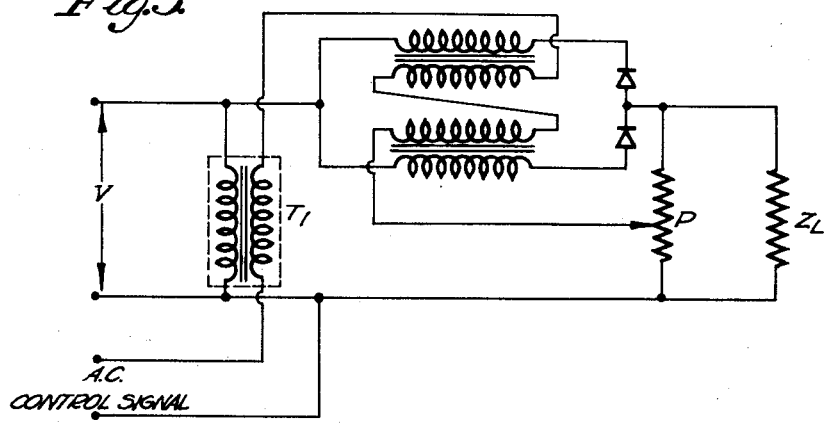
Fig. 5 is a schematic diagram of a doubler magnetic amplifier embodiment of the invention.

The present invention, however, is not limited either in concept or scope to the employment of impedances in the form of transformers to develop the proper cancellation potentials. Fig. 5 illustrates a magnetic amplifier in which a transformer $T_1$ is placed across the excitation source to develop one of the cancellation signals by the same means as is employed in the embodiment of Fig. 3, but an impedance P is connected in the load circuit rather than a second transformer. A potential is developed thereacross having substantially the waveform of the load current.

The impedance P has a variable tap arranged and connected so as to impress an appropriate amplitude of signal upon the control circuit to effect the remaining cancellation. In each of the embodiments of Fig. 3 and Fig. 5, the impedance which is used to develop one of the cancellation voltages is connected in parallel with the load. Moreover, the turns ratio N must be of the order of at least 2 for the tapped voltage to be twice the amplitude of the excitation voltage.

Figure 6:
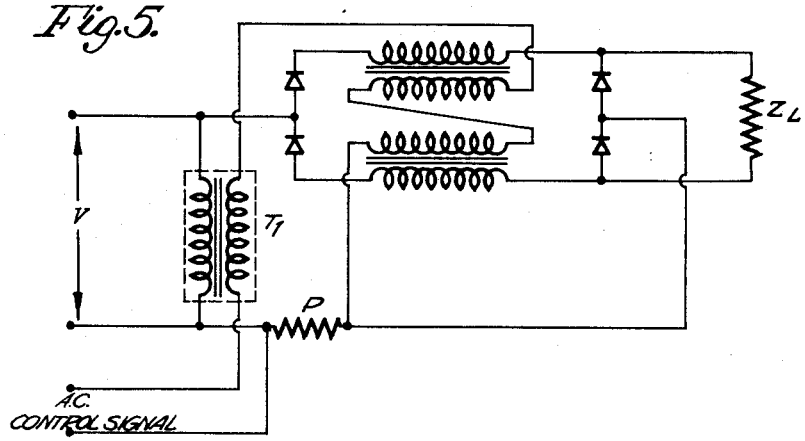
Fig. 6 is a schematic diagram of a bridge magnetic amplifier embodiment of the present invention.

In the embodiment of Fig. 6, however, an impedance P illustrated schematically in the form of a resistance is placed in the path of the load currents returning to the excitation source. This resistance is also connected in the control circuit so that it is common to both the load circuit and the control circuit, thereby impressing upon the control circuit the potential waveform developed across the impedance P by the flow of load current therethrough. The impedance P is chosen of the proper value to develop a signal of an amplitude which will achieve the desired cancellation of the unwanted induced potentials remaining in the control circuit.

Figure 7:
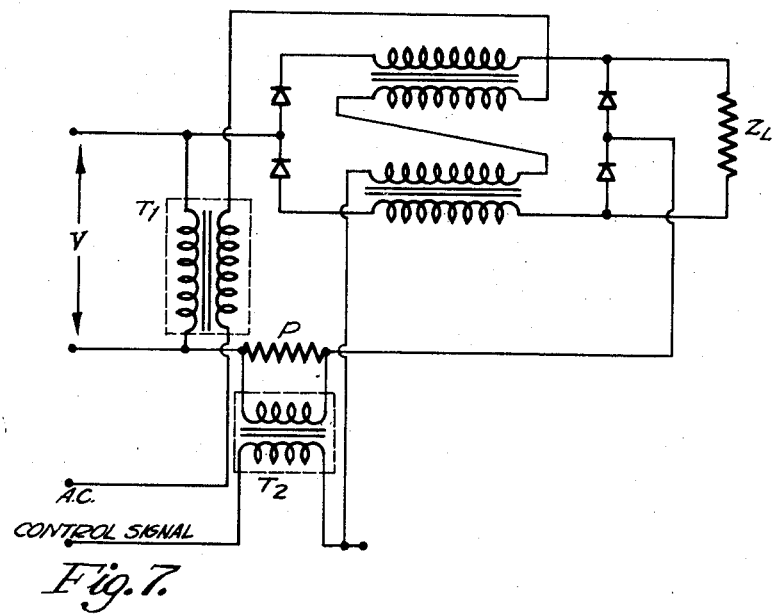
Fig. 7 is a schematic diagram of another bridge magnetic amplifier embodiment of the present invention.

The embodiment of Fig. 7 is similar to that of Fig. 6 in the basic configuration of the magnetic amplifier and has an impedance P connected in the path of the load currents returning to the excitation source. The impedance P, however, is not connected in the control circuit directly but has connected across it the primary winding of a transformer $T_2$, the secondary winding of which is connected to the control circuit. A second transformer $T_1$ has its primary winding connected across the excitation source and its secondary winding connected in the control circuit so as to complete cancellation of the unwanted induced potentials therein.

Figure 8:
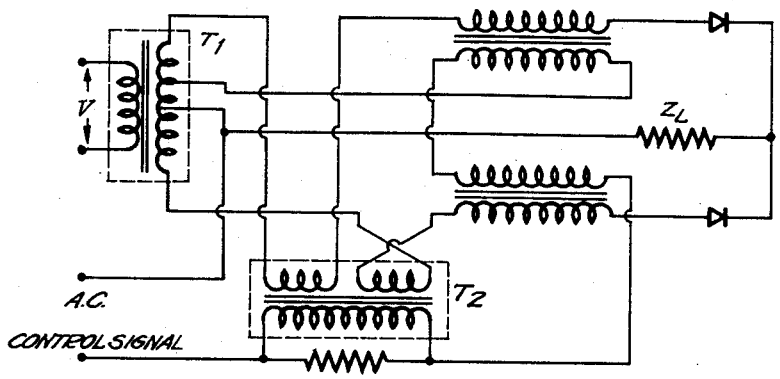
Fig. 8 is a schematic diagram of a full-wave, center-tap, magnetic amplifier embodiment of the invention.

The embodiment illustrated in Fig. 8 is a center-tap version of the present invention wherein the control winding of the magnetic amplifier is connected across a portion of the secondary winding of a transformer $T_1$ which has the excitation potential V impressed upon its primary winding. A second transformer $T_2$ is employed in which there are two primary windings, one of which is connected in series with each of the load windings so that the load currents which flow must pass therethrough. The secondary winding of the second transformer $T_2$ is connected into the control circuit so as to impress thereon the potentials developed by the flow of the load currents. The total result of impressing both these potentials upon the control circuit in appropriate amplitudes is the total cancellation of the unwanted potentials induced therein.

Throughout this disclosure and discussion thus far, it has been assumed that the load impedance is substantially resistive as indicated in the schematic drawings. This implies, of course, that the load currents have virtually the same waveforms as the load potentials and therefore a cancellation waveform developed from the load current will be substantially of the same waveform as the load potential. However, the present invention may be readily practiced in applications involving loads which are not purely resistive by selecting for the generation of the cancellation potential, an impedance having suitable characteristics to develop from the load currents, a potential having a waveform comparable to the unwanted induced potentials in the control circuit.

It should also be recognized that in actual practice, it may be desirable to utilize a secondary control circuit comprising a number of secondary control windings wound in magnetic flux relation to the load windings and connected to receive a secondary or auxiliary control signal. This arrangement affords a means of effecting magnetic bias, for instance, which may be used to shift the quiescent conduction point and change the firing angle. The concept of the present invention applies in substantially the same manner to magnetic amplifiers so modified, and it is to be understood that the use of such bias, while effecting improved efficiency in some applications, does not involve any significant or material departure from the operation of embodiments previously described insofar as this invention is concerned.

One of the most desirable features of the present invention is that the two cancellation potentials which are generated in accordance with the disclosed concept and teachings are derived from sources related to the basic operative functions of the magnetic amplifier so that a change in operation of the magnetic amplifier will be instantaneously accompanied by a commensurate change in the cancellation potentials developed. Thus if the points of conduction of the magnetic amplifier are advanced or retarded, changing the duration of magnetizing current flow, and thereby changing the duration of the undesired potentials induced in the control windings, a consistent, correlated change will be effected in the duration of the cancellation potential sufficient to achieve complete cancellation.

Similarly, upon a change in amplitude of the applied potential, there is an immediate proportional change in the respective amplitudes of the cancellation potentials sufficient to accomplish complete cancellation of the undesired potentials which also change in amplitude. This feature is an inherent characteristic of apparatus operating in accordance with the present invention and is a most desirable feature since the cancellation feature will respond instantaneously and automatically to changes in operation of the magnetic amplifier without requiring constant readjustment.

Since many changes could be made in the above construction and many apparently widely different embodiments of this invention could be made without departing from the scope thereof, it is intended that all matter contained in the above description or shown in the accom-

What is claimed is:

1. In a magnetic amplifier comprised of a pair of load current paths connected to an alternating current power source in a full-wave circuit, and a control circuit magnetically linked thereto in an arrangement adapted to control the flow of currents through said load paths by means of an alternating current control signal; means for developing a first potential having the waveform of said alternating current power source but opposite in phase thereto, means for developing a second potential having the waveform of the load potential, and means to impress said first and second potentials upon said control circuit with equal instantaneous amplitudes whereby to cancel unwanted potentials induced in said control circuit.

2. In a magnetic amplifier comprised of a pair of load current paths connected to an alternating current power source in a full-wave circuit, and a control circuit magnetically linked thereto in an arrangement adapted to control the flow of currents through said load paths by means of an alternating current control signal; means for developing in said control circuit a potential having the waveform of said alternating current power source but opposite in phase thereto, an impedance connected to pass the total currents through said load paths, and means connected to impress upon said control circuit the potential developed across a portion of said impedance, whereby the combined waveforms impressed upon said control circuit cancel the potential induced in said control circuit during the flow of magnetizing currents.

3. In a magnetic amplifier comprised of a pair of load current paths connected to an alternating current power source in a full-wave circuit, and a control circuit magnetically linked thereto in an arrangement adapted to control the flow of currents through said load paths by means of an alternating current control signal; an impedance connected across said alternating current power source, means connected to impress upon said control circuit the potential developed across a portion of said impedance, an impedance connected to pass the total currents through said load paths, and means connected to impress upon said control circuit the potential developed across a portion of said last-named impedance, whereby the combined waveforms impressed upon said control circuit cancel the potential induced in said control circuit during the flow of magnetizing currents.

4. In a magnetic amplifier comprised of a pair of load current paths connected to an alternating current power source in a full-wave circuit, and a control circuit magnetically linked thereto in an arrangement adapted to control the flow of currents through said load paths by means of an alternating current control signal; a first transformer having its primary winding connected across said alternating current power source and its secondary winding connected to said control circuit, a second transformer having its primary winding connected to develop a potential proportional to that portion of the source voltage which causes load current to flow, its secondary winding connected to said control circuit, whereby the combined potentials impressed upon said control circuit cancel the potential induced in said control circuit during the flow of magnetizing currents.

5. A magnetic amplifier in accordance with claim 4 in which the winding ratios of said transformers are such that produce a composite potential waveform of amplitude equal to the potential induced in said control circuit during the flow of magnetizing currents.

6. In a full-wave doubler magnetic amplifier comprised of a pair of load current paths connected to a source of alternating current for supplying power to a load, and a control circuit magnetically linked thereto in an arrangement adapted to control the flow of currents through said load current paths by means of an alternating current signal, a transformer having its primary winding connected across said alternating current power source and its secondary winding connected to said control circuit, an impedance connected in parallel with said load, said impedance having a variable tap connected to said control circuit whereby the potentials impressed upon said control circuit cancel the unwanted potentials induced therein.

7. In a full-wave bridge magnetic amplifier comprised of a pair of load current paths connected to a source of alternating current for supplying power to a load, and a control circuit magnetically linked thereto in an arrangement adapted to control the flow of currents through said load current paths by means of an alternating current signal; a transformer having its primary winding connected across said alternating current power source and its secondary winding connected to said control circuit, an impedance connected to pass the total currents through said load paths, said impedance being also connected in said control circuit, whereby the potentials impressed upon said control circuit cancel the unwanted potentials induced therein.

8. In a full-wave bridge magnetic amplifier comprised of a pair of load current paths connected to a source of alternating current for supplying power to a load, and a control circuit magnetically linked thereto in an arrangement adapted to control the flow of currents through said load current paths by means of an alternating current signal; a transformer having its primary winding connected across said alternating current power source and its secondary winding connected to said control circuit, means for developing a potential having the waveform of the total load current flow, a transformer having its primary winding connected to receive said last-named potential and its secondary winding connected to said control circuit, whereby the potentials impressed upon said control circuit cancel the unwanted potentials induced therein.

9. In a full-wave magnetic amplifier comprised of a pair of load current paths each connected to one side of a center-tapped source of alternating current for supplying a load connected between the output of said load current paths and said center-tap, and a control circuit magnetically linked thereto in an arrangement adapted to control the flow of currents through said load current paths by means of an alternating current signal; means for impressing a selectable portion of said alternating current source upon said control circuit, and a transformer comprised of primary windings, one of which is connected in each of said load current paths, and a secondary winding connected to said control circuit whereby the potentials impressed upon said control circuit cancel the unwanted potentials induced therein.

10. In a magnetic amplifier constructed to be energized from an alternating-current source and controlled in accordance with an alternating voltage so as to supply energy to a load, the combination comprising, magnetic core means, a pair of load windings disposed in inductive relationship with the magnetic core means, circuit means for so interconnecting the pair of load windings with the load and with the alternating-current source that the load windings are alternately energized, a transformer having an input and an output, the input of the transformer being connected to be responsive to the current flow through the pair of load windings, another transformer having an input and an output, the input of said another transformer being such as to be interconnected with the alternating-current source, a control winding disposed in inductive relationship with the magnetic core means, and other circuit means for connecting the outputs of said transformers and the control winding in series circuit relationship with one another and for rendering said series circuit responsive to said alternating voltage, so that the voltage induced in the said series circuit is bucked out by the output voltage of the said transformers.

11. In a magnetic amplifier constructed to be energized from an alternating-current source and controlled in accordance with an alternating voltage so as to supply energy to a load, the combination comprising, magnetic core means, a pair of load windings disposed in inductive relationship with the magnetic core means, circuit means for so interconnecting the pair of load windings with the load and with the alternating-current source that the load windings are alternately energized, an electrical device having an input and an output, the input of the electrical device being connected to be responsive to the current flow through the pair of load windings, another electrical device having an input and an output, the input of said another electrical device being such as to be interconnected with the alternating-current source, a control winding disposed in inductive relationship with the magnetic core means, and other circuit means for connecting the outputs of said electrical devices and the control winding in series circuit relationship with one another, and for rendering said series circuit responsive to said alternating voltage, so that the voltage induced in the said series circuit is bucked out by the output voltages of the said electrical devices.

12. In a magnetic amplifier constructed to be energized from an alternating-current source and controlled in accordance with an alternating voltage so as to supply energy to a load, the combination comprising, magnetic core means, a pair of load windings disposed in inductive relationship with the magnetic core means for so interconnecting the pair of load windings with the load and with the alternating-current source that the load windings are alternately energized, a transformer having a primary winding and a secondary winding, the primary winding being connected to be responsive to the current flow through the pair of load windings, another transformer having a primary winding and a secondary winding, the primary winding of said another transformer being connected to be responsive to the alternating-current source, a control winding disposed in inductive relationship with the magnetic core means, and other circuit means for connecting said secondary windings and the control winding in series circuit relationship with one another and for rendering said series circuit responsive to said alternating voltage, so that the voltage induced in the said series circuit is bucked out by the voltages across the said secondary windings.

References Cited in the file of this patent

Scorgie: "Fast Response With Magnetic Amplifiers," U.S. Naval Research Laboratory Report 4205, July 29, 1953, 18 pages.